Patented Dec. 17, 1946

2,412,817

UNITED STATES PATENT OFFICE 2,412,817

AMINOPHTHALIMIDES

Harold T. Lacey, Plainfield, and Robert E. Brouillard, Somerville, N. J., assignors to American Cyanamid Company, New York, N. Y., a corporation of Maine No Drawing. Application August 3, 1944,
Serial No. 547,988

3 Claims. (Cl. 260—326)

This invention relates to new fluorescent compounds, to the use thereof in coloring and to products colored therewith.

More specifically, the fluorescent compounds of the present invention constitute aminophthalalkylolimides having the structural formula

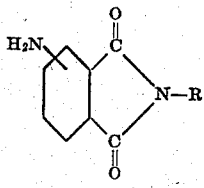

in which the amino group is in the 3 or 4 position and R is an alkylol radical such as $-C_2H_4OH$, $-C_3H_6OH$, $-C_4H_8OH$ and the like.

In recent years fluorescent compounds have attained considerable importance in advertising, decorations, exhibitions and in stage work. They have been variously used for blackout signs, on billboards, in plastics, on the instrument panels of airplanes, for identification marks on vehicles and for other similar purposes.

They have found use in such widely divergent operations as being admixed with fertilizer to show distribution through soil; to show the penetration of biological fluids in bacteria; to show distribution of oil in leather and water-proofing compounds in concrete; to detect flaws in metal; to locate sources of water seepage in mines and oil wells; to accelerate the bleaching of oils by ultra-violet light; to accelerate the sterilization of fruit juices by ultra-violet light and in face creams to screen out harmful ultra-violet rays.

They have found wide acceptance in textile treating operations. For example, they are used in textile printing to make colorless prints which are visible under ultra-violet light. The compounds of the present invention are substantive dyes for such artificial fibers as cellulose acetate, nylon and vinyon. When dyed with these materials, fibers are colorless to a very pale blue-green or yellow-green in ordinary light but exhibit a brilliant yellow-green shade when exposed to ultra-violet light.

There is therefore an increasing demand for fluorescent materials which are readily produced from available materials and which have enhanced fluorescent properties. It is a principle object of the present invention to provide a new group of fluorescent materials which are readily produced, fluoresce strongly and are adapted for many purposes. It is also a further object of the invention to produce fluorescent materials which are particularly useful in the dyeing of artificial fibers and the natural vegetable and animal fibers to produce new and improved shades and effects.

In general, the aminophthalalkylolimides fluoresce a bright blue in very dilute solutions but the shade gradually turns to a yellow-green as the solutions become more concentrated. However it is an important feature of the present invention that when stronger shades are desired, the fluorescent materials of the present invention may be incorporated with non-fluorescent dyestuffs. Dyeings produced in this way exhibit the color characteristics of the non-fluorescent dye in ordinary light and fluoresce brilliantly in the shade of the non-fluorescent dyestuff under ultra-violet light. For example, cellulose acetate fibers dyed with a mixture of 3-aminophthalethylolimide and Methylene Blue (C. I. 922) appear a brilliant bright blue in ordinary daylight which is very similar to the blue fluorescence exhibited under ultra-violet light.

It is also to be noted that the fluorescent properties of many dyestuffs are enhanced by making mixed dyeings with aminophthalalkylolimides. Then when cellulose acetate is dyed with a mixture of 3-aminophthalethylolimide and Rhodamine 6G (C. I. 752) the daylight shade is approximately that obtained using Rhodamine 6G alone, but under ultra-violet light the dyeing is even more brilliant.

The dyestuffs of the present invention may be prepared by any suitable method. Thus, for example, the potassium salt of a phthalimide may be prepared and then treated with a halide of the radical which is to be attached to the imide nitrogen. Another method is to treat phthalic acid with an amine to form an acid amide and then treat the amide to close the imide ring. Similarly, a substituted phthalic anhydride may be treated with an amine to give substituted imides.

Perhaps the simplest method in operation and the most economical to carry out is the preferred method in which a nitrophthalic acid is condensed with an aminoalcohol and the resultant amide is heated sufficiently to be dehydrated to the desired nitroimide. The nitro group can then be reduced by any known method. Any of the methods listed, however, may be used to prepare the aminophthalethylolimides of the present invention.

The invention will be more fully described in conjunction with the following examples which are meant to be illustrative only and not by way of limitation. All parts are by weight unless otherwise noted.

EXAMPLE 1
Preparation of nitrophthalic acids 110 parts of sulfuric acid (D=1.84) is heated to 95° C. and 110 parts of phthalic anhydride is added over a 10-minute period with stirring. The addition of phthalic anhydride causes the temperature to go down 8–10° C. The temperature is readjusted to 95° C. and 184 parts of mixed acid ($H_2SO_4$—56.5%; $HNO_3$—27%) is added to the partially dissolved phthalic anhydride at such a rate that the temperature does not exceed 105° C. The addition requires about 30 minutes if the temperature of the external water bath is maintained at 98–100° C. The temperature of the reaction mixture is then maintained at 95–100° C. for 3 hours, after which it is allowed to cool to 60° C. and poured onto 300 parts of finely divided ice with stirring. The temperature of the mixture after drowning is about 23° C. After stirring for 1 hour the mixture is filtered and the cake sucked as dry as possible. It is a mixture of 3- and 4-nitrophthalic acids. The wet presscake thus obtained is slurried in 95 parts of water at room temperature and stirred for 15 minutes. The 3-nitrophthalic acid, which does not dissolve, is then filtered out and the cake sucked as dry as possible. The moisture content of the filter cake is determined by the toluene method and the 3-nitrophthalic acid is used "as is" in the condensation step which follows.

EXAMPLE 2
3-aminophthalethylolimide

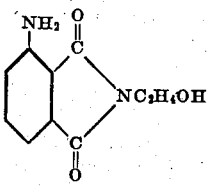

The wet presscake of 3-nitrophthalic acid obtained according to Example 1, is slurried in 50 parts of water and 16.8 parts of monoethanolamine is added. An exothermic reaction results and the temperature of the mixture goes up to about 60° C. The reaction mixture is then heated to 160–165° C. until all evolution of water has ceased and for 30 minutes longer. The mixture is then cooled to 70° C. and diluted with 100 parts of alcohol. After stirring to produce a homogeneous mixture, the nitrophthalethylolimide is added slowly to a previously boiled and cooled mixture of 94.4 parts of iron borings, 2 parts of 5N hydrochloric acid and 125 parts of water. The addition requires about 30 minutes. The mixture is then refluxed for 1 hour after which the alcohol is removed by distillation, and water is added to maintain the original volume. The iron slurry is filtered hot and the presscake washed with 25 parts of water at 95° C. The filtrate is cooled to 15–20° with stirring to precipitate the yellow crystalline 3-aminophthalethylolimide, which is removed from the slurry by filtration. The melting point of the product after one crystallization from alcohol is 145–146° C.

EXAMPLE 3
Dyeing with 3-aminophthalethylolimide

A bath comprising 2 parts of 3-aminophthalethylolimide prepared according to Example 2, 20 parts of sodium chloride, 0.25 part of lauryl sulfate and 0.25 part of sodium pyrophosphate in 3500 parts of water is prepared. This bath is heated to 95° C. and 100 parts of cellulose acetate treated therein for one hour. The dyeing so produced has a slightly yellow tint in daylight but fluoresces a brilliant yellow-green when exposed to ultra-violet radiations.

EXAMPLE 4
4-aminophthalethylolimide

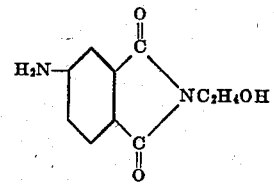

53 parts of 4-nitrophthalic acid, recovered from the filtrate of Example 1, is slurried in 100 parts of water, and 16.8 parts of monoethanolamine is added. The mixture is heated to 160–165° C. until all evolution of water has ceased and for 30 minutes longer. The 4-nitrophthalethylolimide thus produced is cooled to 70° and diluted with 100 parts of alcohol. After stirring to produce a homogeneous mixture, the product is added to a mixture of 94.4 parts of iron borings, 2 parts of 5N hydrochloric acid and 125 parts of water which had been boiled for 5 minutes and then cooled to 75° C. The addition requires about 30 minutes. The mixture is then refluxed for 1 hour after which the alcohol is removed by distillation, and water is added to maintain the original level. The mixture is filtered hot and the iron sludge washed with 25 parts of water at 95° C. The filtrate is cooled to 15–20° C. with stirring to precipitate the yellow crystalline 4-aminophthalethylolimide, which is removed from the slurry by filtration. The melting point of the product after one crystallization from alcohol is 168° C.

EXAMPLE 5
Dyeing with 4-aminophthalethylolimide 100 parts of cellulose acetate is dyed with the 4-aminophthalethylolimide, according to the method described in Example 3, a dyeing is obtained whose properties correspond to that obtained from the 3-isomer in Example 3.

EXAMPLE 6
Mixed 3- and 4-aminophthalethylolimides 53 parts of a mixture of 3- and 4-nitrophthalic acid, obtainable by the nitration of phthalic anhydride as described in the Example 1, is slurried in 100 parts of water, and 16.8 parts of monoethanolamine is added. The reaction mixture is then heated to 160–165° C. until all evolution of water has ceased and for 30 minutes longer. The mixture is then cooled to 70° C. and diluted with 100 parts of alcohol. The resulting solution of the mixed 3- and 4-nitrophthalethylolimides is added to a slurry of 94.4 parts of iron borings and 2 parts of 5N-hydrochloric acid and 125 parts of water. The addition requires about 30 minutes. The mixture is then refluxed for one hour, after which the alcohol is removed by distillation and water is added to maintain the original level. The mixture is then filtered hot and the residue washed with 25 parts of water at 95° C. The filtrate is cooled 15–20° with stirring to precipitate the product which is removed by filtration.

EXAMPLE 7

*Dyeing with mixed aminophthalethylolimides*

The mixture of 3- and 4-aminophthalethylolimides so produced is used to dye cellulose acetate according to the method described in Example 3. Dyeings so produced have properties corresponding to those of dyeings from either 3- or 4-aminophthalethylolimides.

While the above examples have been concerned with the production of aminophthalethylolimides, the invention is by no means so limited to the ethylol derivative. It is to be noted in all the examples that the ethylol group is added to the structure by the use of a slight excess of monoethanolamine. If it is desired to produce a product having a different alkynol group, the appropriate monoalkynolamine may be substituted in the procedure to produce corresponding methylol, propylol, butylol and the like derivatives. The color characteristics both in ordinary light and under fluorescent conditions are similar in each case. Therefore, since the other alkanolamines are not always as readily available as the ethylolamine, the product derived using the latter is perhaps the most advantageous to prepare.

We claim:

1. As new compositions of matter aminophthalalkylolimides corresponding to the formula

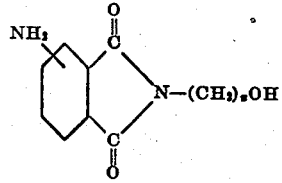

in which $x$ is a small whole number selected from the group consisting of 2, 3, and 4.

2. As a new composition of matter 3-aminophthalethylolimide.

3. As a new composition of matter 4-aminophthalethylolimide.

HAROLD T. LACEY.
ROBERT E. BROUILLARD.